April 14, 1953 J. FLOCKHART 2,634,691
MACHINE FOR EXTRUDING ONE OR MORE MATERIALS
Filed April 18, 1949 6 Sheets-Sheet 1

JAMES FLOCKHART,
INVENTOR.

BY
ATTORNEY

April 14, 1953  J. FLOCKHART  2,634,691
MACHINE FOR EXTRUDING ONE OR MORE MATERIALS
Filed April 18, 1949  6 Sheets-Sheet 2

JAMES FLOCKHART,
INVENTOR.

BY
ATTORNEY

April 14, 1953 J. FLOCKHART 2,634,691
MACHINE FOR EXTRUDING ONE OR MORE MATERIALS
Filed April 18, 1949 6 Sheets-Sheet 3

JAMES FLOCKHART, INVENTOR.

BY *Orl R. Goshen*

ATTORNEY

April 14, 1953   J. FLOCKHART   2,634,691
MACHINE FOR EXTRUDING ONE OR MORE MATERIALS
Filed April 18, 1949   6 Sheets-Sheet 4
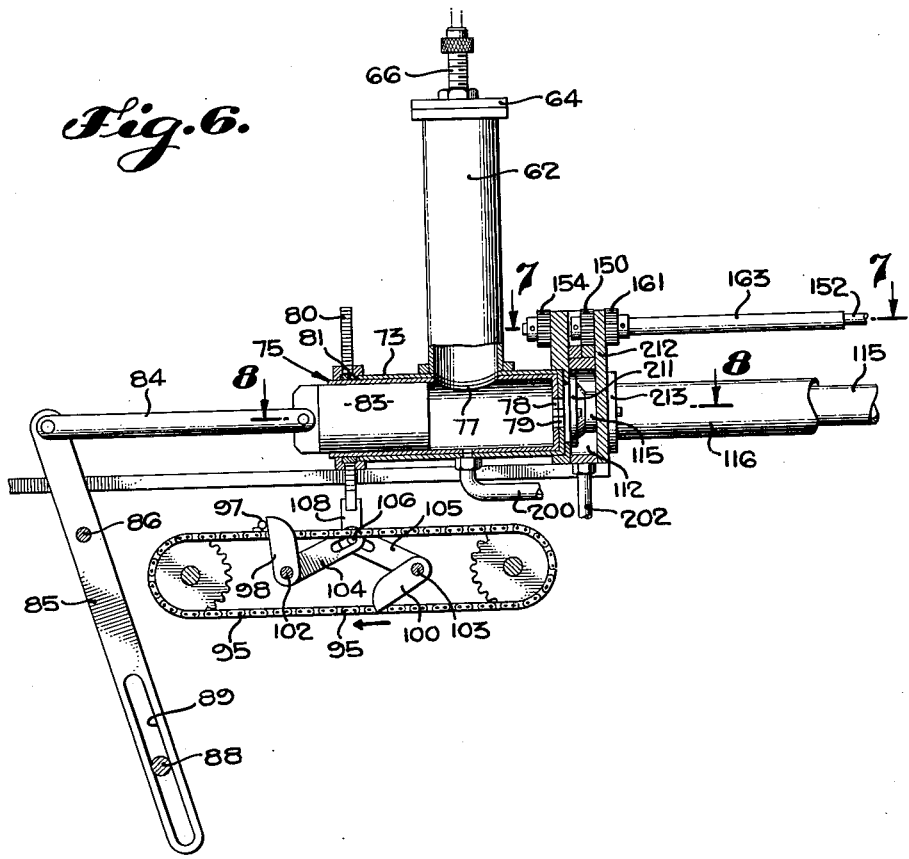
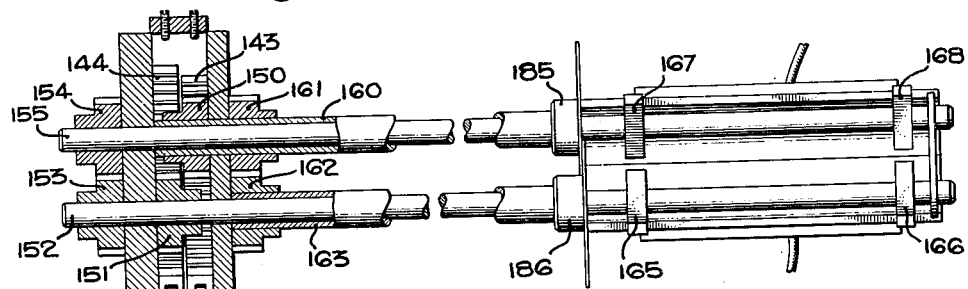
JAMES FLOCKHART,
INVENTOR.
BY *Orl R. Goohau*
ATTORNEY April 14, 1953   J. FLOCKHART   2,634,691
MACHINE FOR EXTRUDING ONE OR MORE MATERIALS
Filed April 18, 1949   6 Sheets-Sheet 5

JAMES FLOCKHART,
INVENTOR.

BY
ATTORNEY

April 14, 1953        J. FLOCKHART        2,634,691

MACHINE FOR EXTRUDING ONE OR MORE MATERIALS

Filed April 18, 1949        6 Sheets-Sheet 6

JAMES FLOCKHART, INVENTOR.

BY *Carl R. Goshaw*

ATTORNEY

Patented Apr. 14, 1953

2,634,691

UNITED STATES PATENT OFFICE 2,634,691

MACHINE FOR EXTRUDING ONE OR MORE MATERIALS

James Flockhart, Los Angeles, Calif., assignor of one-half to Harry A. Vincent, Los Angeles, Calif.

Application April 18, 1949, Serial No. 88,218

9 Claims. (Cl. 107—1)

This invention relates to automatic forming or conditioning equipment or apparatus, and particularly to a machine for shaping and delivering tamale meat and corn meal ready for wrapping, although the machine may be used to form or pack other materials.

Tamale machines have been constructed and used, various types of such machines being shown in U. S. Patents No. 1,654,871 of January 3, 1928; No. 2,134,862 of November 1, 1938; No. 2,142,468 of January 3, 1939; No. 2,303,351 of December 1, 1942; and No. 2,343,599 of March 7, 1944. It will be noted that the machines of these patents utilize screw feeds for extruding the meal and meat to the wrapping machine, or use a gear pump, such as shown in Patent No. 2,343,599. The present invention is directed to a tamale machine which utilizes a predetermined bore and adjustable piston strokes to determine the amounts of corn meal and meat or gravy which are extruded to form tamales of desired sizes and weights. Variable amounts of other materials may be similarly controlled. Separate screw feed hoppers are provided for the ingredients, such as the corn and meat, these units operating continuously to load separate equalized pressure chambers, from which the piston strokes force a constant amount of each ingredient through the extruder. During the extruding operation, the pressure feed chambers are isolated from the piston cylinders, after which the cylinder or port outlets are closed, the pressure chambers opened, and each ingredient drawn and urged into its respective cylinder to provide the materials for successive tamales. Since the stroke of each piston is individually adjustable, and when once adjusted, always measures the same amount of material, tamales may be produced which seldom vary from the exact weight desired, thus saving much material by eliminating overweight tamales which occur when tamales are made by hand or with certain other types of machines. Since the screw feed from the hoppers is independent of the piston feed, the piston feed may provide any desired pressure on the material, depending upon its consistency.

The machine of the invention has a triple speed control. The speed of the entire machine can be increased or decreased to vary the output of the machine; the stroke of the pistons can be varied to change the size and weight of the tamales; and the speed of the feeding screws can be varied to deliver the necessary amounts of ingredients at the desired consistency when the size of the tamale is varied. Other features reside in the severing or cutting and delivering mechanism, which is in the form of a pair of oppositely operating knives which close the discharge tubes during the severing operation, and a clam shell delivery unit, which is electrically heated to insure the smooth and certain delivery of each tamale. The machine may be easily and rapidly cleaned through the piping of water to the critical points therein. Another mechanical drive feature reduces the number of cams and the over-all mechanism to a minimum, this feature being a chain drive control of the extruding pistons and the severing and clam shell discharge unit. By changing the piston action to alternate operation, continuous extrusion of a material may be accomplished.

The principal object of the invention, therefore, is to facilitate the formation and production of one or more materials.

Another object of the invention is to provide an improved tamale making machine having an intermittently operating piston extruder for each separate ingredient and which are individually controllable to provide the desired proportioning of the ingredients, as well as a predetermined size of the complete tamale.

A further object of the invention is to provide an improved tamale machine with speed controls for varying the rate at which tamales of any particular size are produced and speed controls for varying the proportioning of the ingredients and the size of the tamale.

A still further object of the invention is to provide an improved tamale machine having individual pressure-equalized storage chambers fed from the supply hoppers of the machine.

A still further object of the invention is to provide a tamale machine which may be quickly and rapidly washed and cleaned after use thereof.

A still further object of the invention is to provide an improved discharge unit for a tamale machine, the unit severing the completed tamale to size and insuring the delivery thereof.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 6 is a detailed view, partly in cross-section, showing the control mechanism for the cylinder shown in Fig. 5.

Fig. 7 is a cross-sectional view of the operating cams for the discharge unit taken along the line 7—7 of Fig. 6.

Figure 1:
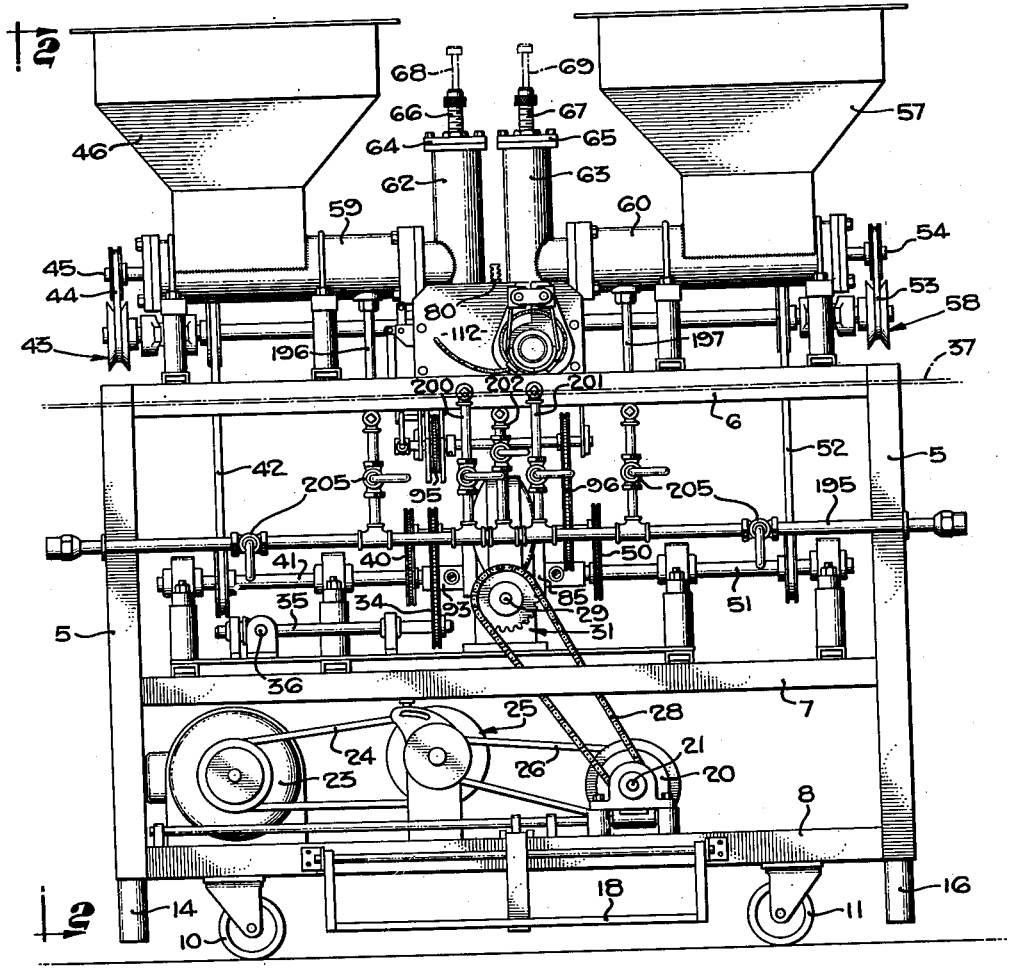
Fig. 1 is a front, elevational view of a tamale machine embodying the invention.
Figure 2:
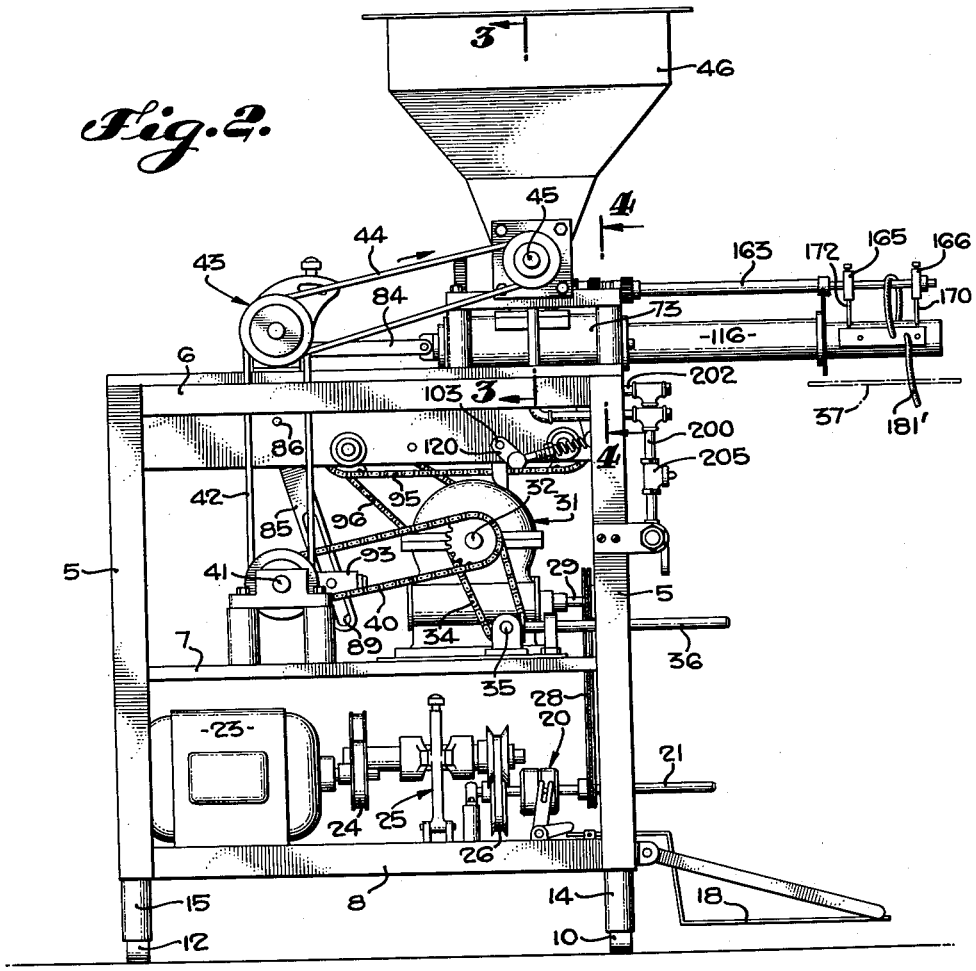
Fig. 2 is a side, elevational view of the machine embodying the invention and taken along the line 2—2 of Fig. 1.

Referring now to the drawings, in which the same numerals identify like elements, a frame, having upright leg members 5 and horizontal members 6, 7, and 8, has mounted thereon the various shafts, gears, and other drive and control elements of the machine embodying the invention. Although the machine is being described in connection with the making of tamales, it is also suitable for forming and packaging other emulsified materials, as explained hereinafter. The frame is mounted on wheels such as shown at 10, 11, and 12, the corners of the frame being supplied with screw jacks, such as shown at 14, 15, and 16, which may be lowered to anchor the machine in any location. Mounted on one of the lower cross members, is a treadle mechanism 18, which, when pressed downwardly with the foot, will actuate a clutch 20 mounted on a shaft 21. Mounted on the lower cross piece 8, is a motor 23, which, through a belt 24, drives a standard commercial type of speed change mechanism 25, which, in turn, by belt 26, drives the clutch 20. The extension of the shaft 21 may be connected to the drive of a tamale wrapping machine (not shown). The shaft 21 is coupled, by a chain 28, to a shaft 29, connected to a reduction gear box 31. A shaft 32, whose ends protrude from box 31, has sprockets on one end thereof, one driving a chain 34, which rotates a shaft 35, which, through bevel gears, drives a shaft 36, which may, in turn, be connected to a tamale conveyor belt drive (not shown) for a belt such as shown in broken lines 37 in Figs. 1 and 2. These gears may be spaced to intermittently stop the belt at the instant when a tamale is deposited thereon.

Figure 3:
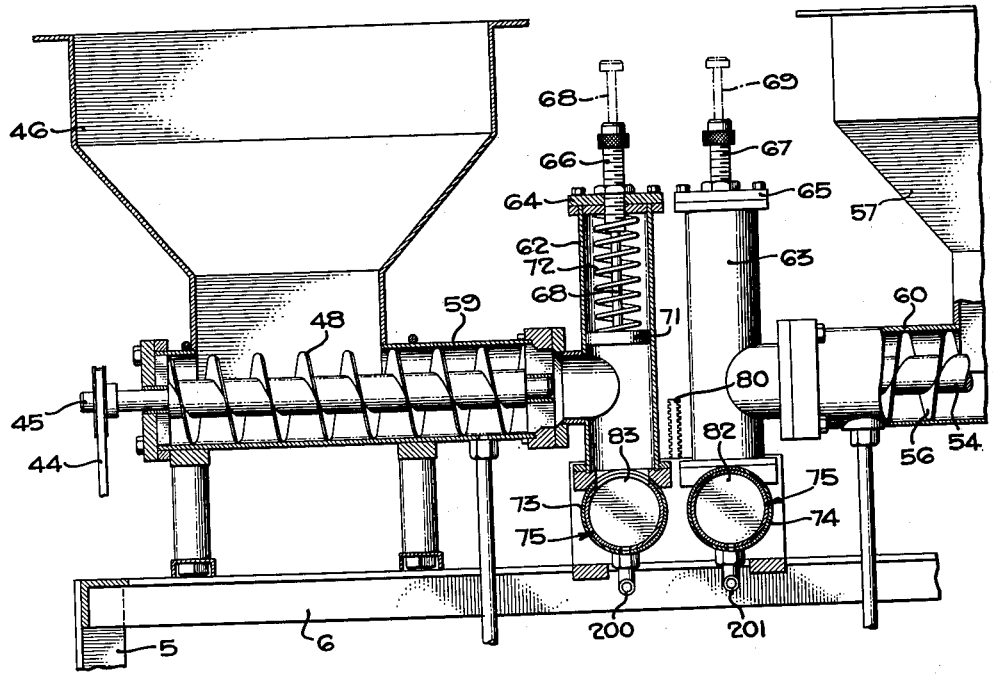
Fig. 3 is a partial cross-sectional view showing the hopper and feed screw means of the invention and taken along the line 3—3 of Fig. 2.

Another sprocket on shaft 32 drives a chain 40, which rotates a shaft 41, this shaft driving a belt 42 connected to a speed change mechanism 43, which is belted by a belt 44 to a pulley on shaft 45 of the screw at the bottom of a hopper 46. As shown in Fig. 3, the shaft 45 drives a screw 48 at the bottom of the hopper 46. On the other side of the gear unit 31 (see Fig. 1), is a sprocket mounted on the other end of shaft 32 and driving chain 50, similar to drive chain 40, which rotates shaft 51, and, through belts 52 and 53, drives a shaft 54 of the screw 56 in hopper 57. This drive also has a speed change unit 58 similar to the one shown at 43, so that the speed of rotation of the screws 48 and 56 may be independently varied with respect to one another, or varied simultaneously.

Referring now to the hopper and screw feed means, the right-hand end of screw 48 operates within a cylinder 59, while the left-hand end of screw 56 operates within a cylinder 60, these screws being of the right and left-hand types so that the tamale ingredients are mixed and fed from the hoppers 46 and 57 to feeding or storage chambers in the lower portions of vertical container cylinders or tubes 62 and 63. These cylinders have closing top plates 64 and 65, respectively, through which are threaded hollow screw bolts 66 and 67, within which are slidable piston rods 68 and 69. At the lower end of the rods 68 and 69, are pistons, such as shown at 71 in tube 62, between which and the upper ends of the cylinders, are springs, such as shown at 72. Thus, pressure against the under-surface of the pistons 71 will compress the springs in accordance with the position to which they are adjusted by the screw bolts 66 and 67.

Figure 5:
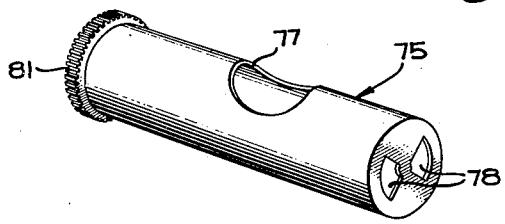
Fig. 5 is a perspective view of the sleeve valve cylinder used in the machine.

The lower ends of the cylinders 62 and 63 are connected to a pair of parallel, horizontal container cylinders 73 and 74, within which are sleeve valve container cylinders 75, one of which is shown in perspective in Fig. 5. Each cylinder 75 has an upper opening or port 77, which acts as a valve and is adapted to coincide with openings in the lower ends of the tubes 62 and 63 when in one position, and close the tubes when the cylinders 75 are rotated substantially ninety (90) degrees. The cylinders 75 also have end openings or ports 78, adapted to coincide with similarly shaped openings or ports 79 (see Fig. 4) in the ends of cylinders 73 and 74 to form outlet valves. These ports or valves are so arranged that, when the bottom ends of cylinders 62 and 63 are closed, openings 78 and 79 coincide or are in alignment. Thus, rotation of the cylinders 75 approximately ninety (90) degrees by a double-sided rack 80, in mesh with the teeth of the ring gears 81, will close the cylinders or tubes 62 and 63 and open the ends of the cylinders 75, rotation of the cylinders 75 in the opposite direction opening tubes 62 and 63 and closing the ends of the cylinders 75. The cylinders 75 are filled when openings 77 coincide with the openings in the lower ends of tubes 62 and 63 and ports 78 are closed, and the material is extruded therefrom when the tubes 62 and 63 are closed and the ports 78 are open.

Figure 8:
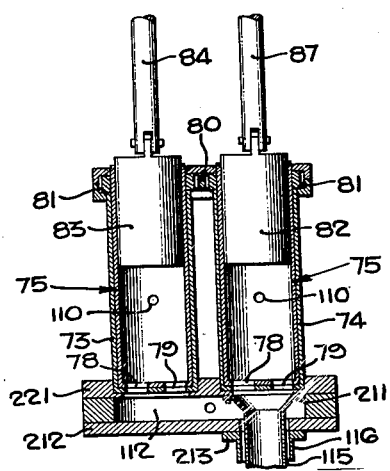
Fig. 8 is a cross-sectional view taken along the line 8—8 of Fig. 6.
Figure 13:
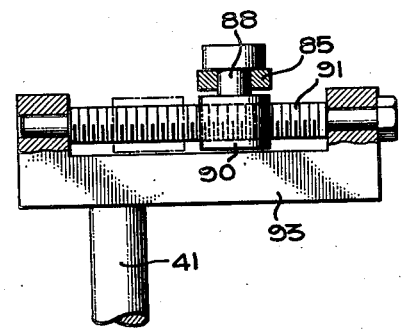
Fig. 13 is a detailed view of the stroke adjusting mechanism for the extruding pistons.

Within each cylinder 75, is a piston, such as shown at 82 and 83 (see Fig. 8), the pistons being driven by piston rods 84 and 87, connected to the end of crank arms, such as shown at 85, and crank arm 85 being pivoted at 86 and driven by a shaft 88 slidable within a slot 89. (See Fig. 6.) The shaft 88 is shown in Fig. 13 connected to a block 90, threaded on a shaft 91, extending between the ends of a yoke 93. The yoke 93 is mounted on the end of rotatable shaft 41. Rotation of shaft 41 reciprocates the piston 83, the length of the stroke of the piston 83 being controlled by the position of the block 90 on the shaft 91. That is, as the block 90 approaches the axis of the shaft 41, the stroke of the piston 83 will be diminished, and vice versa. A similar mechanism, mounted on the end of shaft 51, reciprocates the other piston 82 in cylinder 75 in tube 74, it being realized that the shafts 41 and 51 may be synchronized so that the pistons operate simultaneously or alternately. Simultaneous operation will extrude two ingredients simultaneously and intermittently, while alternate operation will provide a continuous flow through a common outlet.

Figure 4:
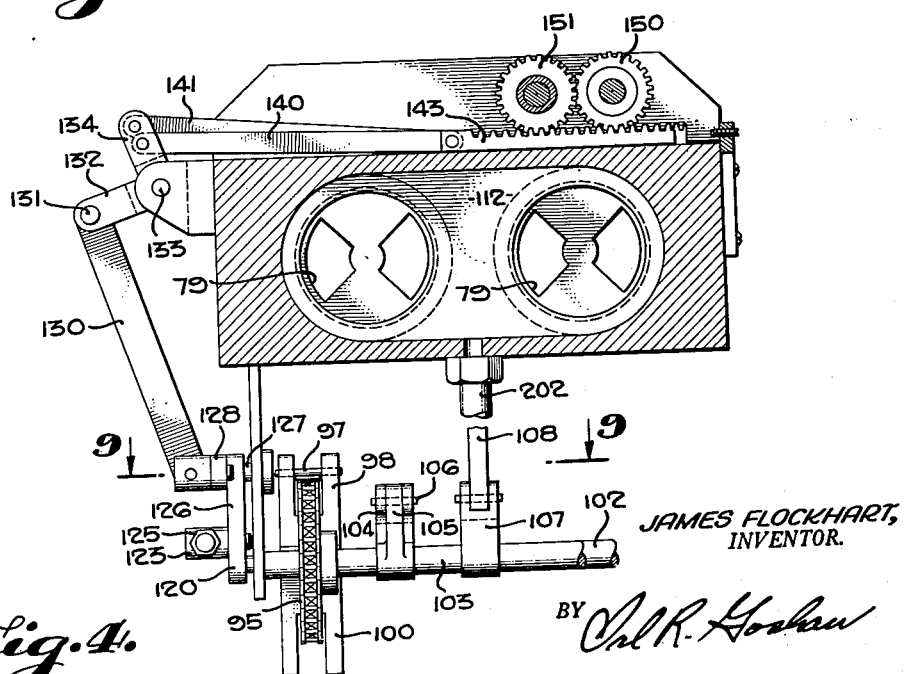
Fig. 4 is a detailed view, partly in cross-section, of the discharge mixing chamber and taken along the line 4—4 of Fig. 2.
Figure 9:
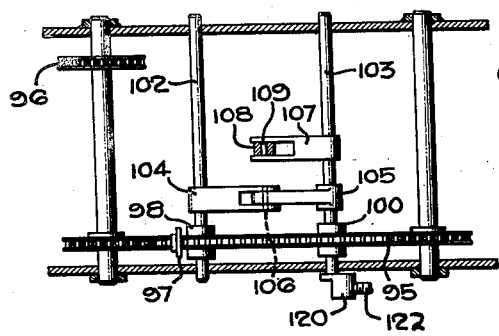
Fig. 9 is a partial view of the control mechanism taken along the line 9—9 of Fig. 4.

To control the opening and closing of the ports 77 and 78 in the sleeve valve cylinders 75, the rack 80, in mesh with ring gears 81, is reciprocated intermittently in a vertical direction in a predetermined relationship with the strokes of the pistons 83. This is accomplished by a chain 95 driven by a chain 96 from the gear box 31. Referring now to Figs. 4, 6, and 9, it will be noted that the chain 95 has a lug 97 attached thereto, which is adapted to make contact with the legs of a U-shaped arm 98, spanning the chain, when the arm 98 is in the position shown in Fig. 6, and will make contact with the legs of a similar arm 100, when the arm 100 is in the same relative position as that shown by the arm 98. The arms 98 and 100 are fixedly mounted on shafts 102 and 103, to which are also attached a pair of arms 104 and 105, having slotted openings in the ends thereof, through which a pin 106 passes. Also attached to shaft 103 is a yoke arm 107, to the ends of which a link member 108 is connected by pin 109, (see Fig. 9) the link member 108 being connected to the lower end of the double-toothed rack 80. Thus, as the chain is driven in the direction shown by the arrow in Fig. 6, the lug 97 moves the end of the arm 98 to the right, which lowers the slotted end of arms 104 and 105, rotates shaft 103 and yoke 107, and moves the rack 80 downwardly. As the arm 105 moves downwardly, the arm 100 is moved to a vertical position, so that when the lug 97 moves to the left along its lower path, it will rotate arm 100 to the left, rotate shaft 103 and yoke 107, and raise the rack 80. This reciprocal movement of the rack rotates the sleeve valves 75, alternately opening and closing the lower ends of cylinders or tubes 62 and 63 and the exit ports 78, as explained above.

To describe the operation of the portion of the machine thus far described, the hoppers 46 and 57 are filled with the ingredients, such as corn meal in hopper 46 and meat in hopper 57, if tamales are to be made. The machine is then started and the screws 48 and 56 are rotated continuously to feed these ingredients into the respective storage chambers between the bottom surfaces of pistons 71 and the sleeve valve cylinders 75. Assuming that the openings 77 are up, the cylinders 75 will be filled with materials, during which time the ports 78, at the end of the cylinders, are closed. The rack 80 is then raised and the openings 77 rotated ninety (90) degrees, which closes the exits from the chambers in the cylinders 62 and 63 and opens the end of the cylinders 78. It is to be noted that, during the time the cylinders 62 and 63 are closed at the bottom, the screws 48 and 56 continue to feed the materials into the chambers under the pistons 71. The sizes of the chambers can expand to accommodate the input by compressing the springs 72. Thus, speed tolerances are provided for the screw feeds and the densities and consistencies of the ingredients are maintained the same as when placed into the hoppers. During operation, the rods 68 and 69 move up and down as the tubes 62 and 63 are opened and closed, any tendency to vary their average position in any direction being corrected by the speed control of the screws. Water openings 110 (see Fig. 8) in the lower portions of cylinders 75, may be also opened and closed, these openings being used to flush the cylinders when cleaning.

As soon as tubes 62 and 63 are closed and ports 78 opened, the pistons 82 and 83 move toward the discharge ends of the cylinders 75, which extrudes the ingredients from the cylinders 75. The meat in hopper 57 and cylinder 63, is discharged directly into a tube 115 passing through chamber 112, and the corn meal in hopper 46 and cylinder 62, into chamber 112 and around tube 115. (See Fig. 8.) The end of tube 115 is slightly tapered, where connected to cylinder 74. At the end of the forward strokes of the pistons 82 and 83, the rack rotates the cylinders 75 back to their original position, closing the openings 78 and bringing the openings 77 to their upper positions coincident with the lower exits of tubes 62 and 63. The material then in the tubes 62 and 63 will not only fall through the openings 77 under the urging of spring biased pistons 71, but will be drawn therein by the suction of the pistons on their backward strokes to their positions shown in Fig. 6. Thus, the reciprocating action of the rack 80 and the pistons 82 and 83 continue to intermittently fill the respective cylinders 75 and extrude the materials therefrom. The meat ingredient is fed through the smaller tube 115, and the corn meal ingredient is extruded from chamber 112 through the larger tube 116 coaxially surrounding tube 115. Thus, the meal surrounds the meat ingredient to form the tamale structure as the ingredients are discharged from the concentric ends of tubes 115 and 116.

To sever the tamale at the ends of tubes 115 and 116, which now consists of an outside layer of meal and an inner core of meat, and to deposit it on the belt 37, the mechanism shown in Figs. 4, 7, 10, 11, and 12 functions in a manner now to be described. On the end of shaft 103, is mounted an arm 120 which carries a threaded shaft 122, on which is a drilled ball 123 mounted between a spring 124 and adjusting nuts 125 (see Fig. 12). The ball 123 has an arm 126 mounted thereon, which is pivoted on a shaft 127, the shaft having attached thereto an arm 128. To the end of arm 128 is connected a driver rod or arm 130, which is pivotally connected at 131 to an arm 132. The arm 132 is part of a crank fixedly pivoted at 133 and having triple yoke legs 134, 135, and 136. Connected between the legs 134 and 135, is a rack arm 140, and between the yoke legs 135 and 136, is a rack arm 141. As shown in Fig. 4, ends of these rack arms are connected at different distances from the pivot point of the yoke legs 134, 135, and 136, as shown in Fig. 4, which will move the arms different amounts for the same movement of driver arm 130. Rack arm 140 is connected to the end of rack 143, and rack arm 141 is connected to rack 144.

The rack 143 is in mesh with a pinion 150, and the rack 144 is in mesh with a pinion 151, pinion 151 oscillating a shaft 152, on which it is mounted and on which is also mounted a pinion 153 in mesh with a pinion 154 attached to a shaft 155. Thus, oscillation of the pinion 151 will oscillate shafts 152 and 155 in opposite direction. Similarly, the rack 143 is in mesh with a gear 150, which is attached to a shaft 160 rotatable on and concentric with shaft 155, and on which is mounted a pinion 161 in mesh with a pinion 162 on a shaft 163, rotatable on and concentric with shaft 152. The shaft 152 has mounted thereon blocks 165 and 166, and the shaft 155 has mounted thereon blocks 167 and 168. To these blocks are mounted depending rods 170, 171, and 172, to which are attached respective clam shell sections 175 and 176. Thus, oscillation of shafts 152 and 155 will bring the bottom edges of the shell sections 175 and 176 together, as shown in Fig. 10, and open them to the position shown in Fig. 11, which will deposit the tamale on belt 37.

Figure 10:
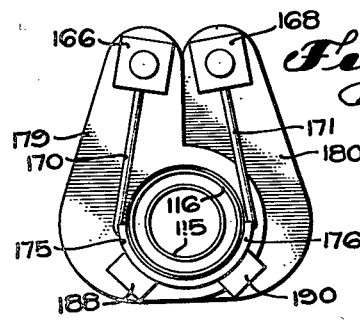
Figs. 10 and 11 are front, elevational views of the severing knives and clam shell discharge unit.
Figure 11:
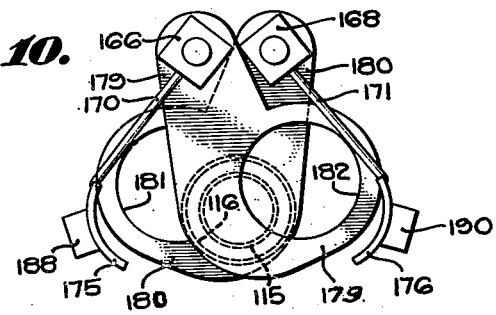
Figure 12:
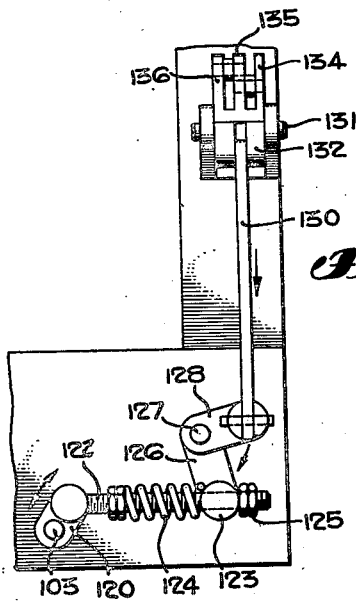
Fig. 12 is a detailed view of the crank control for the discharge unit shown in Figs. 10 and 11.

Simultaneously with the opening and closing of the shell sections 175 and 176, two knife blades 179 and 180 are actuated, these blades having openings 181 and 182, respectively, through which the tamale passes when the blades are in the position shown in Fig. 10. Oscillation of shafts 160 and 163, to which these blades are attached by collars 185 and 186, will sever the tamale at the ends of the tubes 115 and 116. Since the amount of actuation of the blades 179 and 180 should be different from that of the clam shell sections 175 and 176, it is obtained by the positioning of the left-hand ends of the drive arms 140 and 141 at different positions in the yoke members 134, 135, and 136, as mentioned above. To obtain a further adjustment of the amount of actuation of these elements, the ball 123 may be differently positioned on the threaded rod 122, the spring 124 providing a safety factor in case the blades or shell sections become jammed in any manner. It will be noted that the shape of the knives 179 and 180 is such that the discharge ends of pipes or tubes 115 and 116 are closed when the knives are in the position shown in Fig. 11 and the shell sections 175 and 176 are open. This prevents any discharge of material during the severing and delivering operation.

Mounted on the back of shell sections 175 and 176, are a pair of electrical heating elements 188 and 190, these elements being fed with current over conductors in a cable 181'. These heating elements maintain the shell elements 175 and 176 at a predetermined temperature, so that the tamales will slide easily from the shell sections at all times when they are separated, regardless of the ambient temperature which could congeal the oil or grease in the tamales.

The timing of the operation of the knives and shell sections with respect to the pistons 83, is such that as soon as the pistons 83 have reached the end of their forward or delivery strokes, which determines the stopping of the extrusion of the tamale, the knives immediately operate to sever the tamale and the clam shell sections separate to drop the tamale on the belt 37. Timing is accomplished by sprocket and chain connections between the gear box unit 31 and the piston drive shafts 41 and 51, the chain 95, which controls the rack 80 and the sleeve valves 75 and the oscillation of shaft 103 which operates the knives 179 and 180 and the clam shell sections 175 and 176. The spring 124 on threaded shaft 122 provides a safety factor in the event of jamming of the knives or material supporting sections 175 and 176.

Referring again to Fig. 1, it will be noted that plumbing is shown, which includes a horizontal feed pipe 195, to which are connected vertical pipes 196 and 197 leading to the end of the feed cylinders 59 and 60, respectively, and pipes 200, 201, and 202 leading to the cylinders 75 and chamber 112. By operation of the various valves shown at 205, water may be allowed to run into these various sections of the machine to flush and wash them clean immediately after use.

Figure 14:
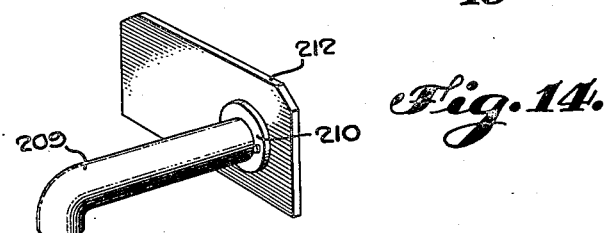
Fig. 14 is a modification of the discharge unit.

Referring now to Fig. 14, a right-angled extrusion spout 209 is shown, which may be attached to one of the feed cylinders 74 by a flange 210, which will replace flange 211 for attaching tube 115 to the outlet of this cylinder, or may be connected to the outer plate 212, as shown by flange 213 for the tube 116. Thus, the filling cans, bottles, or other receptacles, the machine may extrude the material through the spout 209. By removal of plate 212, two different materials may be delivered separately or the same material may be delivered at two different points.

Figure 15:
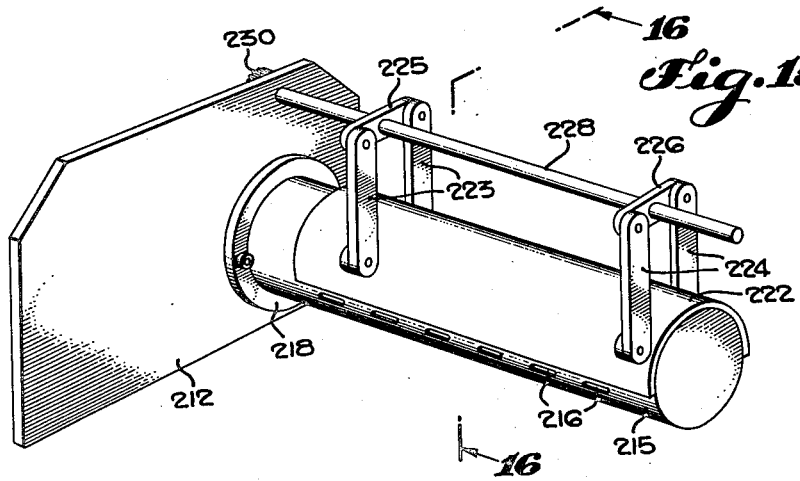
Fig. 15 is a perspective view of a modification of the delivery unit shown in Figs. 10 and 11.
Figure 16:
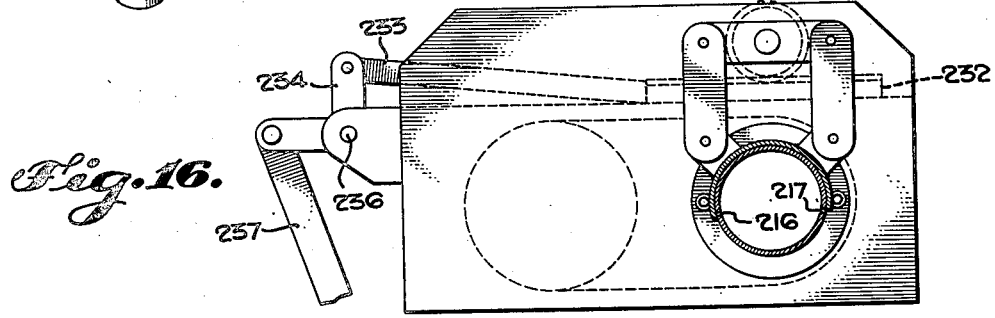
Fig. 16 is an end view of the unit shown in Fig. 15, taken along the line 16—16 thereof.
Figure 17:
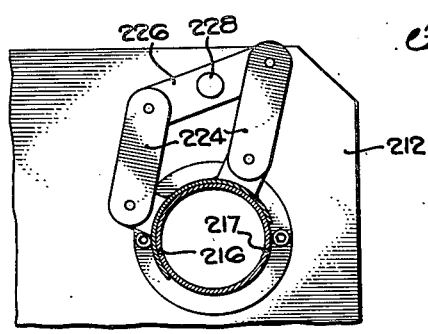
Fig. 17 is an end view showing another position of the delivery unit of Figs. 15 and 16.

Referring now to Figs. 15, 16, and 17, if it is desired to use the machine for the preparation of other foodstuffs, such as ribbon-like corn flakes, a closed end cylinder, such as shown at 215, having a row of elongated apertures 216 on one side, and a similar row of apertures 217 on the other side, spaced substantially diametrically opposite one another, is attached to plate 212 by a flange 218. Mounted over the top portion of cylinder 215, is a semi-cylindrical plate 222 mounted on two pairs of depending arms 223 and 224, connected to cross arms 225 and 226, respectively, which, in turn, are mounted on an oscillatory shaft 228. The shaft has a pinion 230 thereon, which may be geared to a rack 232, similarly to the racks 143 and 144 shown in Fig. 7. The rack has a driving arm 233 similar to one of arms 140 and 141, a crank 234 pivoted at 236, and a connecting rod 237, similar to rod 130 in Fig. 4. As the rack is oscillated, the semi-circular cutter 222 slides over the cylinder 215, the cutter, when in the position shown in Fig. 17, severing the ribbons of material extruded through the openings 216 and closing these openings, while permitting extrusion of the material through openings 217. When the shaft 228 is rotated in the opposite direction, the material will be severed at the openings 217 and allowed to extrude through the openings 216. A single row of apertures could also be used.

The machine as described above, therefore, is capable of mixing two ingredients in any predetermined definite proportions, either intermixing them, when one pipe 116 is used only, or combining them in concentric layers, as just described. By the action of the springs 72, the material can be continually fed by the screws 48 and 56 into the equalized chambers in cylinders 62 and 63 and taken intermittently into the sleeve valve cylinders 75 with constant consistency. The pistons will then extrude an exact predetermined amount of material through the tubes 115 and 116, the proportioning of the material being under the control of the length of the piston strokes to provide the desired size and weight of the extruded product. Furthermore, the speeds of the critical elements, such as the screws 48 and 56, may be separately controlled and the entire machine generally speeded up for faster production.

By a slight modification, receptacles may be filled, while other forms of materials may be manufactured by a modification of the extruding end of the mechanism, as shown in Figs. 14 to 17. inclusive.

I claim:

1. A machine comprising a hopper for material to be formed into a product, means for continuously mixing and moving said material in a predetermined direction, a container having a space into which said material is continuously moved, a second container into which said material is intermittently moved, and piston means for intermittently extruding said material from said second mentioned container, said second mentioned container being a cylinder adapted to be oscillated about its longitudinal axis, said cylinder having an entrance port connecting with said first mentioned container, which port is opened and closed during oscillation of said cylinder, an exit port being provided in said cylinder and adapted to be opened and closed as said cylinder is oscillated, said entrance port being open and said exit port being closed during the movement of said piston means in one direction, and said exit port being open and said entrance port being closed during the movement of said piston means in the opposite direction.

2. A machine comprising a hopper for material to be formed into a product, means for continuously mixing and moving said material in a predetermined direction, a container having a space into which said material is continuously moved, a second container into which said material is intermittently moved, and piston means for intermittently extruding said material from said second mentioned container, a resiliently mounted piston being provided in a portion of said first mentioned container, said resiliently mounted piston varying the size of the space of said first mentioned container into which said material is continuously moved.

3. A tamale making machine, comprising a pair of hoppers for two ingredients of said tamale, screw means at the bottom of said hoppers for advancing the ingredients therein toward one another, a pair of vertically arranged cylinders between said hoppers and connected thereto into the lower portions of which said ingredients are continuously fed, equalizing means in the upper portions of said cylinders, a pair of horizontally disposed cylinders under said first mentioned cylinders and connected thereto and into which said ingredients are intermittently passed, said second mentioned cylinders including sleeve valve cylinders coaxially disposed therein, pistons in said sleeve valve cylinders for intermittently extruding said ingredients therefrom, means for directly carrying one of said ingredients to a discharge point, means for carrying said other ingredient to said discharge point concentrically disposed around said first mentioned ingredient, and means for simultaneously oscillating said sleeve valve cylinders about respective horizontal axes, one extreme position of said sleeve valve cylinders closing said vertical cylinders and opening said sleeve valve cylinders, and another extreme position of said sleeve valve cylinders opening said vertical cylinders and closing said sleeve valve cylinders.

4. A tamale making machine in accordance with claim 3, in which means are provided for varying the timing and lengths of the strokes of said pistons independently of one another to vary the time and amount of said ingredients being discharged from said sleeve valve cylinders during a single excursion of said pistons.

5. A tamale making machine in accordance with claim 3, in which means are provided for individually and independently varying the speed of said screw means to vary the amount of said ingredients fed into said first mentioned cylinders.

6. A tamale making machine in accordance with claim 3, in which means are provided for simultaneously varying the speed of said screw means and said pistons to vary the output of said machine.

7. A tamale making machine in accordance with claim 3, in which said equalizing means in said first mentioned cylinders include pistons and springs positioned intermediate said pistons and the closed upper ends of said vertical cylinders.

8. A machine for forming and delivering material in a certain form, comprising a motor, a hopper, screw means for moving material from said hopper, a container into which said material is continuously delivered, cylindrical means into which said material is intermittently delivered from said container, piston means for intermittently extruding said material from said cylindrical means, gear and chain means connecting said motor to said piston means and said cylindrical means, and drive means connecting said screw means with said motor to continuously rotate said screw means, said gear and chain means including a rotatable shaft, a crank arm on said shaft for driving said piston means longitudinally within said cylindrical means, an oscillatory shaft, a second crank arm on said shaft, and a chain adapted to oscillate said second crank arm, and means connecting said oscillatory shaft with said cylindrical means for oscillating said cylindrical means about its longitudinal axis during substantially stationary periods of said piston means.

9. A machine for forming and delivering material in accordance with claim 8, in which said hopper, said screw means, said container, said piston means, and said cylindrical means are in respective pairs, a tube being provided for directly delivering the material from one hopper and a second concentrically positioned tube for delivering the material from the other hopper.

JAMES FLOCKHART.

References Cited in the file of this patent

UNITED STATES PATENTS

| Number | Name | Date |
| --- | --- | --- |
| 1,077,815 | Droitcour | Nov. 4, 1913 |
| 1,484,251 | Brennan | Feb. 19, 1924 |
| 2,111,497 | Shannon | Mar. 15, 1938 |
| 2,148,451 | Elliott, Sr. | Feb. 28, 1939 |
| 2,154,697 | Phelps | Apr. 18, 1939 |
| 2,193,147 | Stricker | Mar. 12, 1940 |
| 2,271,767 | Hummel | Feb. 3, 1942 |
| 2,303,351 | Gage et al. | Dec. 1, 1942 |
| 2,343,599 | Walter | Mar. 7, 1944 |
| 2,519,014 | Bankey | Aug. 15, 1950 |

FOREIGN PATENTS

| Number | Country | Date |
| --- | --- | --- |
| 648,891 | Germany | Aug. 12, 1937 |